(12) United States Patent　　(10) Patent No.: US 12,606,465 B2
Cosentino et al.　　(45) Date of Patent: Apr. 21, 2026

(54) ELECTROLYTIC BIOCIDE-GENERATING UNIT WITH ENHANCED SCALE PREVENTION

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: ElectroSea, LLC, Plymouth, MN (US)

( * ) Notice: Subject to any disclaimer, the term of this patent is extended or adjusted under 35 U.S.C. 154(b) by 822 days.

(21) Appl. No.: 17/505,293

(22) Filed: Oct. 19, 2021

(65) Prior Publication Data

US 2022/0119287 A1　　Apr. 21, 2022

Related U.S. Application Data

(60) Provisional application No. 63/237,855, filed on Aug. 27, 2021, provisional application No. 63/094,053, filed on Oct. 20, 2020.

(51) Int. Cl.
| | |
|---|---|
| *C02F 1/461* | (2023.01) |
| *C02F 1/467* | (2023.01) |
| *C02F 103/00* | (2006.01) |

(52) U.S. Cl.
CPC ........ *C02F 1/46104* (2013.01); *C02F 1/4674* (2013.01); *C02F 2103/007* (2013.01); (Continued)

(58) Field of Classification Search
None
See application file for complete search history.

(56) References Cited

U.S. PATENT DOCUMENTS

| | | | |
|---|---|---|---|
| 11,027,991 B2 | 6/2021 | Cosentino et al. |
| 2008/0277274 A1 | 11/2008 | Kim et al. |

(Continued)

FOREIGN PATENT DOCUMENTS

| | | | |
|---|---|---|---|
| CN | 1460647 A | 12/2003 | |
| DE | 10009643 A1 * | 9/2001 | ............ C02F 1/4606 |

(Continued)

OTHER PUBLICATIONS

International Search Report and Written Opinion for Application No. PCT/US2021/055631 mailed Jan. 27, 2022.

*Primary Examiner* — Louis J Rufo
(74) *Attorney, Agent, or Firm* — Merchant & Gould P.C.

(57) ABSTRACT

The present disclosure relates to a biocide-generating device for outputting a biocide to a water system. The biocide-generating device includes a housing having a water inlet for receiving water from the water system and a water outlet for outputting water containing biocide to the water system. The biocide-generating device also includes an electrode arrangement having first and second electrodes positioned in the housing for generating biocide in the water within the housing, and an electrical power circuit for establishing a flow of electrical current between first and second electrodes of the electrode arrangement for generating the biocide in the water within the first chamber electrolytic cell. A control system of the biocide-generating device has operational features adapted to inhibit scaling to the electrode arrangement.

11 Claims, 12 Drawing Sheets

(52) U.S. Cl.
CPC    *C02F 2201/008* (2013.01); *C02F 2201/4613*
(2013.01); *C02F 2201/4615* (2013.01); *C02F*
*2303/04* (2013.01); *C02F 2303/20* (2013.01)

(56)                    References Cited

U.S. PATENT DOCUMENTS

| | | |
|---|---|---|
| 2010/0187122 A1 | 7/2010 | Zolotarsky et al. |
| 2013/0105403 A1* | 5/2013 | Chen ........................ G06F 15/00 |
| | | 210/85 |
| 2019/0106339 A1* | 4/2019 | Cosentino ........... C02F 1/46104 |
| 2020/0002194 A1* | 1/2020 | Koizumi ............... C02F 1/4618 |

FOREIGN PATENT DOCUMENTS

| | | |
|---|---|---|
| JP | 2002192161 A | 7/2002 |
| WO | 2019/070877 A1 | 4/2019 |
| WO | 2020/167645 A1 | 8/2020 |
| WO | 2020/210245 A1 | 10/2020 |
| WO | 2021/061612 A1 | 4/2021 |

\* cited by examiner

900

Receive a signal to initiate a new operational period of the electrolytic biocide-generating device    902

Randomly select between first and second opposite polarities for the electrodes of the biocide-generating device    904

Operate the electrodes at the selected polarity upon initiation of the new operational period    906

*FIG. 14*

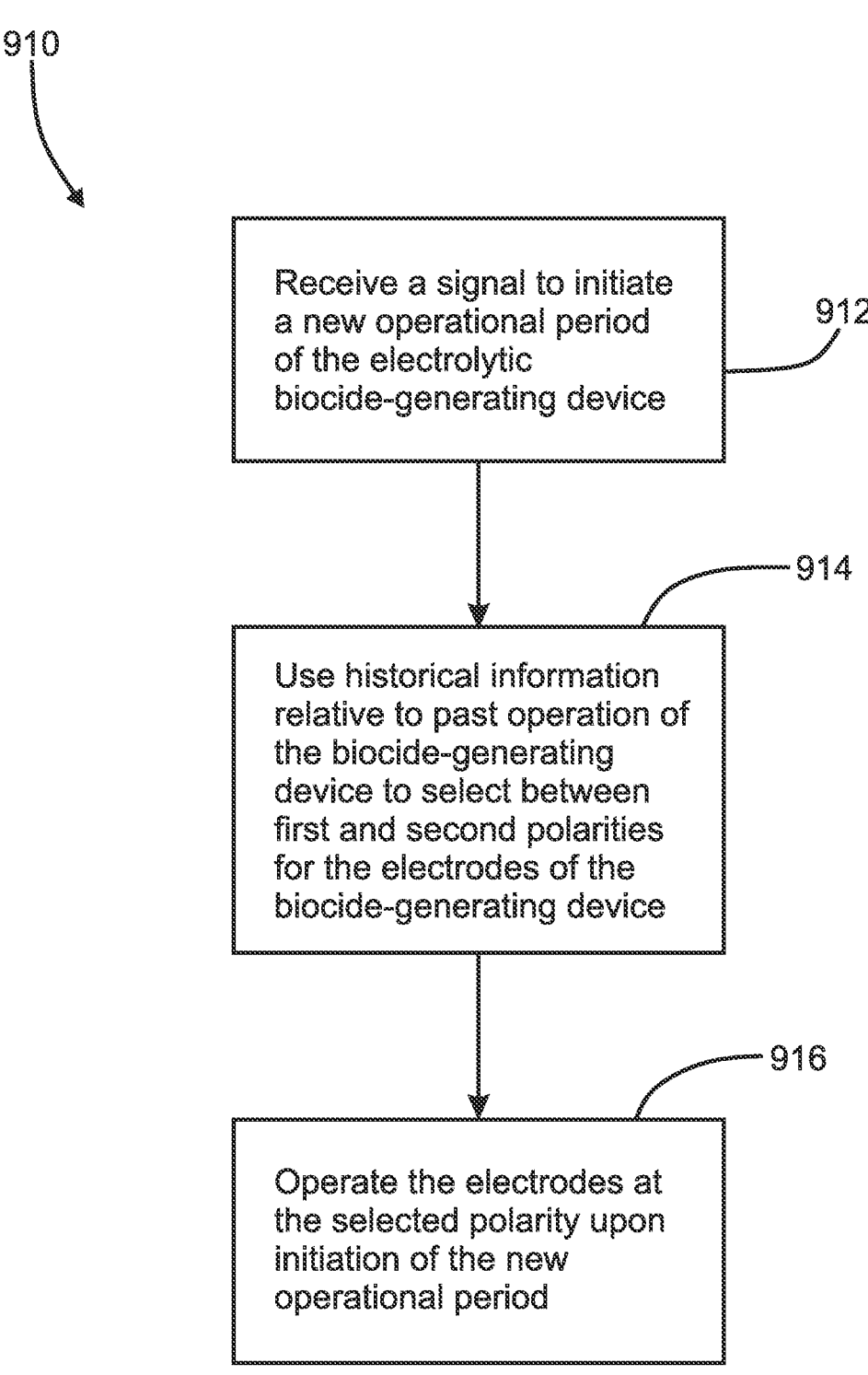

910

Receive a signal to initiate a new operational period of the electrolytic biocide-generating device

912

Use historical information relative to past operation of the biocide-generating device to select between first and second polarities for the electrodes of the biocide-generating device

914

Operate the electrodes at the selected polarity upon initiation of the new operational period

916

ELECTROLYTIC BIOCIDE-GENERATING UNIT WITH ENHANCED SCALE PREVENTION

CROSS REFERENCE TO RELATED APPLICATIONS

This application claims the benefit of U.S. Provisional Patent Application No. 63/094,053, filed Oct. 20, 2020, and U.S. Provisional Patent Application No. 63/237,855, filed Aug. 27, 2021, which applications are incorporated herein by reference in their entirety.

TECHNICAL FIELD

The present disclosure relates generally to biocide-generating devices for reducing or eliminating biofouling within water systems.

BACKGROUND

Biofouling caused by bio-growth (e.g., salt water or fresh water marine growth) can result in the clogging of water systems, and the inefficient operation, overheating, and malfunction of equipment dependent upon the water systems thereby leading to costly downtime and expensive repair. For some applications, the issue of bio-growth within water systems is addressed by periodic (e.g., semi-annual) acid cleaning of the water systems. Acid cleaning is expensive, time consuming, and involves the use of harsh and hazardous chemicals.

Improvements in this area are needed.

SUMMARY

One aspect of the present disclosure relates to a biocide-generating system for inhibiting biofouling within a water system. In one non-limiting example, the system can be a water system of a watercraft such that related equipment (e.g., a heat exchanger) of the watercraft can be operated at peak performance with minimal to no downtime. In certain examples, the biocide-generating system can include an electrolytic arrangement for providing the in-situ generation of biocide within the water passing through the water system. Biocide-generating systems in accordance with the principles of the present disclosure can be used for both salt water (e.g., sea and brackish water) as well as freshwater applications.

Aspects of the present disclosure relate to electrolytic biocide-generating devices and systems having control systems with control features adapted to prevent scaling under conditions in which the electrolytic biocide-generating devices and systems are repeatedly or cyclically turned off after relatively short operational periods or durations.

Another aspect of the present disclosure relates to a biocide-generating system for inhibiting biofouling within a water system of a watercraft. The water system is configured to draw water from a body of water on which the watercraft is supported and includes an electrode arrangement adapted to be incorporated as part of an electrolytic cell through which the water of the water system flows. The biocide-generating system includes a control system that interfaces with the electrode arrangement. The control system includes an electrical power circuit for establishing a flow of electrical current between first and second electrodes of the electrode arrangement to generate a biocide in the water within the electrolytic cell. The control system also includes a switching arrangement operable in a first switch configuration in which the first electrode is an anode and the second electrode is a cathode, and a second switch configuration in which the first electrode is a cathode and the second electrode is an anode. The control system is configured such that upon initiation of a new operational period in which biocide is generated by the biocide-generating system, the control system either: a) randomly selects between the first and second switch configurations; or b) uses information relating to one or more preceding operational periods to select between the first and second switch configurations.

A further aspect of the present disclosure relates to a biocide-generating system for inhibiting biofouling within a water system of a watercraft. The water system is configured to draw water from a body of water on which the watercraft is supported. The biocide-generating system includes an electrode arrangement adapted to be incorporated as part of an electrolytic cell through which the water of the water system flow. The biocide-generating system includes a control system that interfaces with the electrode arrangement. The control system includes an electrical power circuit for establishing a flow of electrical current between first and second electrodes of the electrode arrangement to generate a biocide in the water within the electrolytic cell. The electrode arrangement is operable at a first polarity in which the first electrode is an anode and the second electrode is a cathode and is also operable at a second polarity in which the first electrode is a cathode and the second electrode is an anode. Upon initiation of a new operational period in which biocide is generated by the biocide-generating system, the control system either: a) operates the electrode arrangement at a selected one of the first and second polarities based on a polarity selection protocol that randomly selects between the first and second polarities; or b) operates the electrode arrangement at a selected one of the first and second polarities based on a polarity selection protocol dependent upon historical polarity information derived from past operation of the biocide-generating system.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows:

FIG. 14 outlines another example control strategy in accordance with the principles of the present disclosure for preventing scaling of an electrolytic biocide-generating device.

DETAILED DESCRIPTION

The present disclosure relates to a biocide-generating devices and systems for inhibiting biofouling within a water system. Example biocides can include chlorine and derivatives thereof, copper, and other biocides. Example biocide-generating devices can include electrolytic cells including electrodes adapted to generate biocides such as chlorine and derivatives thereof when electrical current flows across the electrodes. In certain examples, the biocide-generating devices or systems introduce biocide into the water flowing through the water systems in-situ (e.g., in real time during operation of the water systems). Preferably, the biocide is introduced at a concentration high enough to prevent the growth of biomass within the components of the water system. Example water system components through which the biocide treated water flows can include heat exchangers for air conditioners and chillers. In certain examples, such water systems may have operating patterns that repeatedly cycle on and off with the on-cycles being relatively short in duration. Aspects of the present disclosure relate to control systems for electrolytic biocide-generating devices used to provide biocide treated water to systems that cycle on and off and that have relatively short on-cycles (e.g., less than 10 minutes, or less than 7 minutes, or less than 5 minutes, or less than 3 minutes). Aspects of the present disclosure relate to electrolytic biocide-generating devices and systems having control systems with control features adapted to prevent scaling under conditions in which the electrolytic biocide-generating devices and systems are repeatedly or cyclically turned off after relatively short operational periods or durations.

Figure 1:
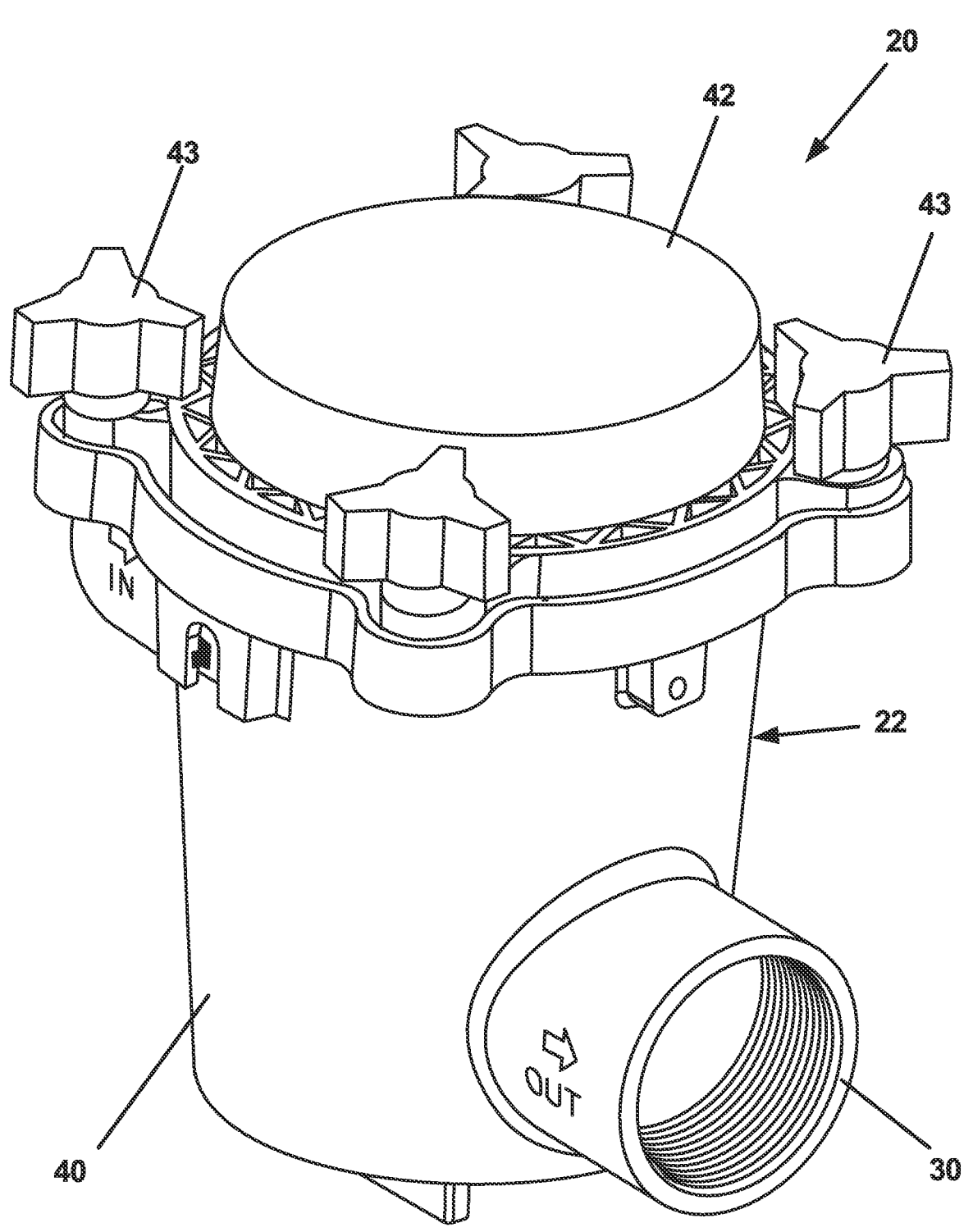
FIG. 1 illustrates a biocide-generating device (e.g., a biocide-generating unit) suitable for practicing aspects of the present disclosure.
Figure 2:
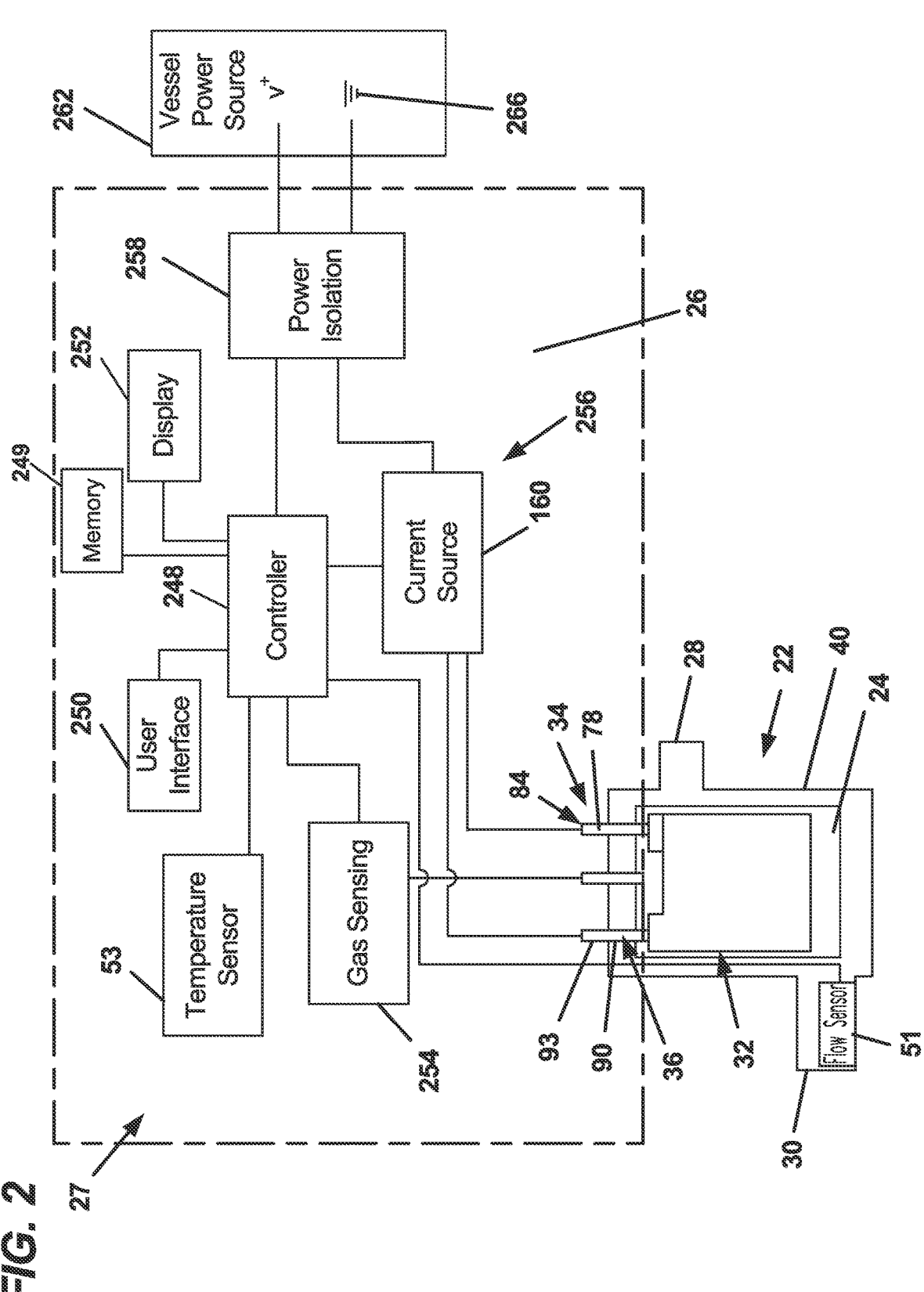
FIG. 2 is a schematic view of the biocide-generating device of FIG. 1.

FIGS. 1-2 depict an example biocide-generating unit 20 (e.g., a biocide-generating device) in accordance with the principles of the present disclosure. The biocide-generating unit 20 includes a unit housing 22 defining a first chamber 24 and a second chamber 26 (see FIGS. 2 and 4). The first chamber 24 provides a location within the unit housing 22 in which biocide can be generated, and the second chamber 26 provides a housing location for circuitry 27 that controls operation of the biocide-generating unit. The unit housing 22 includes a water inlet 28 for receiving water into the first chamber 24 and a water outlet 30 for outputting water containing biocide generated within the first chamber 24 to a water system desired to be treated with biocide (e.g., a water system of a watercraft which may include a heat exchanger for an air conditioner or chiller). The biocide-generating unit 20 also includes an electrode arrangement 32 including first and second electrodes 34, 36 positioned in the first chamber 24 for generating biocide in the water flowing through the first chamber 24 between the water inlet 28 and the water outlet 30 when a voltage is applied across the first and second electrodes 34, 36. Power leads 38 extend outwardly from the unit housing 22. The power leads 38 are adapted for coupling the circuitry 27 within the second chamber 26 to an external power source 262 having its own ground 266. The power source 262 can be a battery, generator, or other power source. In certain examples, the power source can range from 12-240 volts and can provide alternating current (AC) or direct current (DC). Preferred power sources include 12-volt DC, or 24-volt DC, or 110-volt AC or 240-volt AC power sources. At FIG. 4, the circuitry 27 is shown integrated as part of a multi-layer circuit board 29. In certain examples, one or more flow sensors 51 can be used to sense the rate of flow of water through the electrolytic cell, and one or more temperature sensors 53 can be used to sense the temperature of the circuitry 27, the chamber 26, and/or portions of the unit housing 22. Power to the cell can be reduced or terminated by a cell controller when low or no flow conditions are detected and/or when temperatures exceed predetermined levels.

Figure 3:
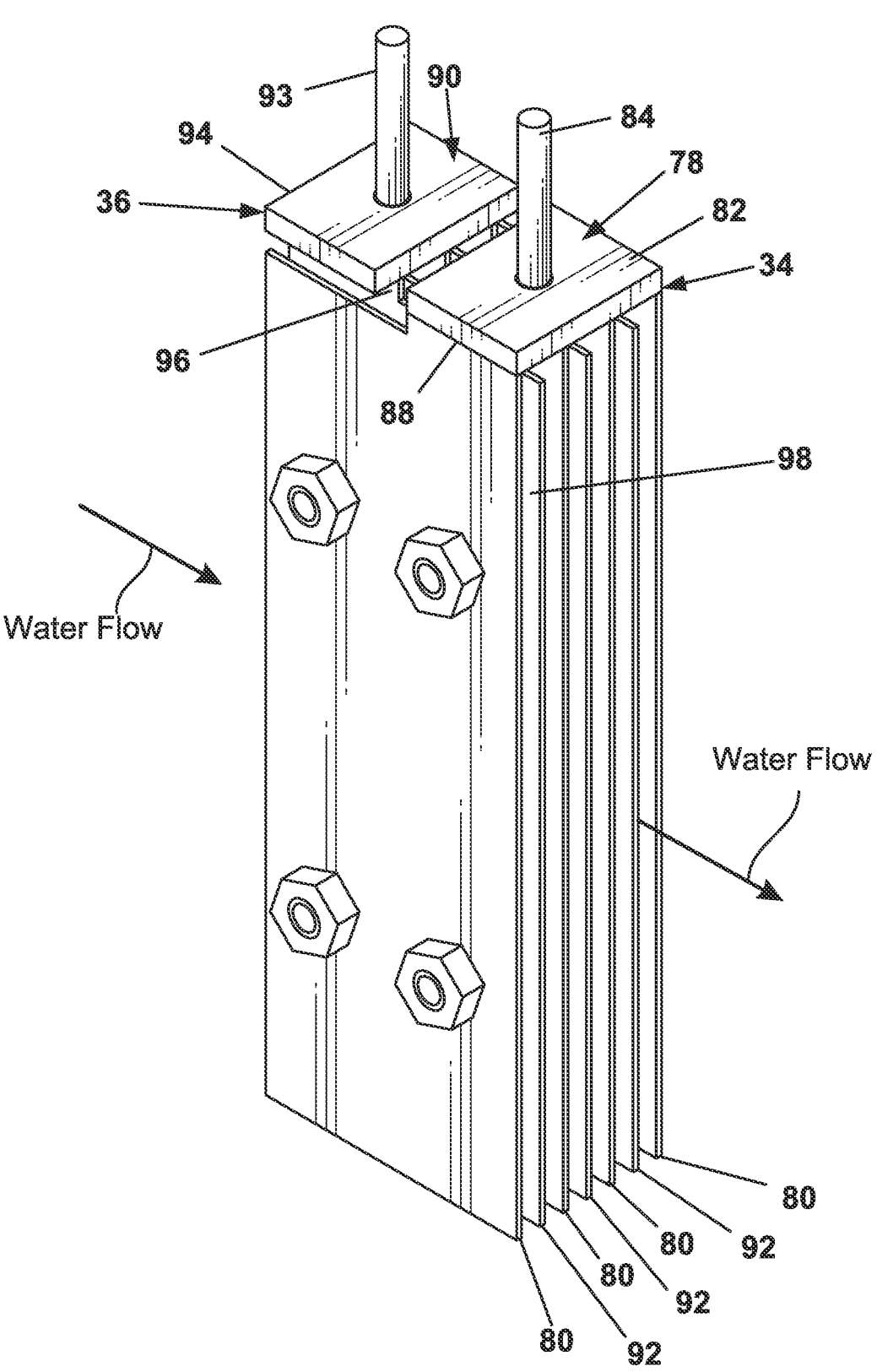
FIG. 3 is a perspective view illustrating an example configuration for an electrode arrangement of the biocide-generating device of FIGS. 1 and 2.

Referring to FIG. 3, the first electrode 34 can include a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering.

Referring still to FIG. 3, the second electrode 36 can have a similar configuration as the first electrode 34. For example, the second electrode 36 includes a second terminal 90 and parallel second electrode plates 92 that are electrically and mechanically coupled to the second terminal 90. The second electrode plates 92 are positioned between the first electrode plates 80 and spaced-apart in relation relative to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93.

In certain examples, the terminal posts, the terminal blocks and the terminal plates can have metal constructions that include a metal material such as titanium or stainless steel. In certain examples, the first and second electrode plates 80, 92 can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In other examples, at least one of the sets of electrode plates 80, 92 is constructed of a material that includes copper such that copper ions are generated when voltage is applied across the plates 80, 92.

The circuitry 27 within the second chamber 26 can provide several functions. Example functions include: a) power conversion (e.g., DC-DC and/or AC-DC power conversion); b) power regulation; c) electrode polarity switching; d) periodically terminating power to the electrodes and connecting the electrodes together and to a zero reference voltage; e) isolating the circuitry from boat ground; f) gas sensing; g) monitoring water flow through the biocide-generating unit 20; and h) and adjusting the magnitude of the electrical current flowing across the electrodes based on the water flow through the first chamber 24. To coordinate and implement this various functionality, the circuitry 27 can include a controller (e.g., controller 248) having one or more processors. The processors can interface with software, firmware, and/or hardware. Additionally, the processors can include digital or analog processing capabilities and can interface with memory 249 (e.g., random access memory, read-only memory, or other data storage). In certain examples, the processors can include a programmable logic controller, one or more microprocessors, or like structures. The processors can also interface with displays 252 (e.g., indicator lights, etc.) and user interfaces 250 (e.g., control buttons, switches, etc.) mounted at an exterior of the unit housing 22. In certain examples, information relating to previous operating cycles can be stored in the memory 249 and can be used by the controller 248 to coordinate operating aspects of the previous operating cycles with future operating cycles.

Figure 4:
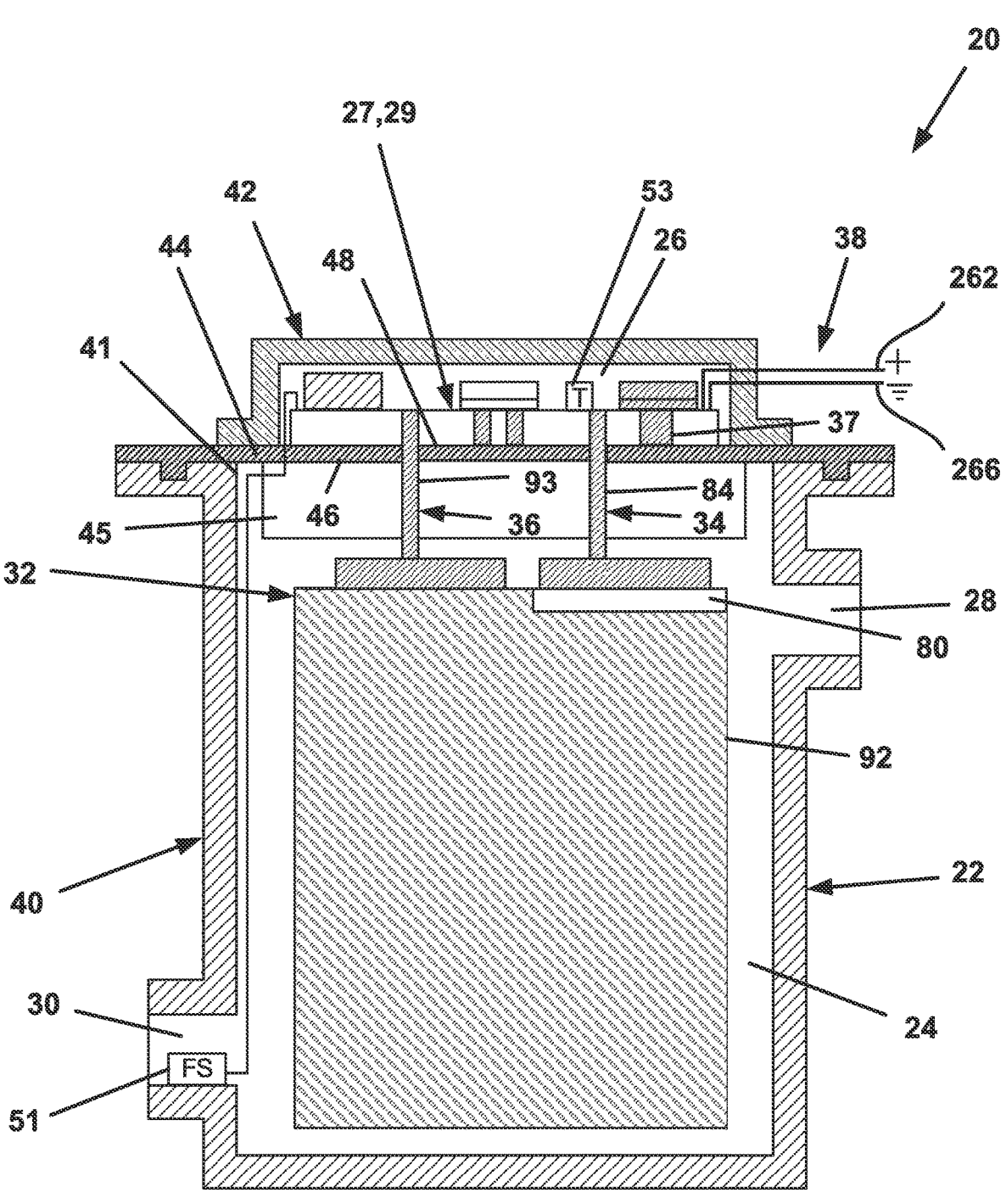
FIG. 4 is a cross-sectional view showing an example arrangement for the biocide-generating device of FIGS. 1-2.

Referring to FIG. 4, the unit housing 22 includes a main housing body 40 defining the first chamber 24. The main housing body 40 has an open end 41. The unit housing 22 also including a housing cover 42 that mounts over the open end 41 of the main housing body 40 to enclose the first chamber 24. The housing cover 42 can attach to the main housing body 40 by fasteners such as bolts 43 (see FIG. 1) or clamps. The second chamber 26 is defined within the housing cover 42. The second chamber 26 can optionally be re-enterable and can include an access panel or door for accessing the interior of the chamber 26. The housing cover 42 includes a base wall 44 having first and second opposite surfaces 46, 48. The second surface 48 is an upper surface that defines a portion (e.g., a base portion) of an interior of the second chamber 26 and is exposed to the interior of the second chamber 26. The first surface 46 is a bottom surface and is adapted to oppose and enclose the open end 41 of the main housing body 40 when the housing cover 42 is mounted on the main housing body 40. With the housing cover 42 mounted to the main housing body 40, the first surface 46 defines a top of the first chamber 24 and is exposed to an interior of the first chamber 24. Thus, the base wall 44 forms a common wall that separates the first and second chambers 24, 26 when the housing cover 42 is mounted on the main housing body 40.

Referring to FIG. 2, the circuitry 27 can include a controller 248 which is shown interfacing with the user interface 250, the display 252, a sensing circuit 254, a cell power circuit 256, and an isolation circuit 258. The sensing circuit 254 can be configured to detect/sense the accumulation of gas within the first chamber 24. The cell power circuit 256 can be configured to supply electrical power to the first and second electrodes 34, 36. In one example, the cell power circuit 256 includes a current source 160 for driving a current through the electrolytic cell which is not dependent upon the load across the electrodes or the applied voltage. The magnitude, frequency and polarity of the current provided by the current source can be varied by the controller. The isolation circuit 258 transfers power from a power source 262 to the circuitry 27 and concurrently provides the circuitry 27 with a zero-voltage reference that is electrically isolated from a boat ground 266. Further details of sensing circuitry, power circuitry, isolation circuitry and polarity switching circuitry are described in U.S. patent application Ser. No. 16/152,176, which is hereby incorporated by reference in its entirety. U.S. application Ser. No. 16/843,328, filed Apr. 8, 2020, is also hereby incorporated by reference in its entirety.

In certain examples, the cell power circuit 256 includes the current source 160 (see FIG. 2). In certain examples, the controller 248 can control the current source 160 via a control line to vary the electrical current flowing between the first and second electrodes 74, 76 based on a water flow through the electrolytic cell (e.g., a volumetric flow rate, mass flow rate). The water flow can be determined by a reading from the flow sensor 51 (e.g., a flow meter) or other means (e.g., pump output data). Example flow sensors can include volumetric flow meters such as positive displacement flow meters, velocity flow meters, hall-effect flow meters (e.g., electrode paddle wheel flow meter) mass flow meters, ultrasonic flow meters and inferential flow meters. Depending upon the type of flow meter used, volumetric flow can be directly measured or calculated/estimated based on flow meter readings. In certain examples, the controller 248 can increase the magnitude of the electrical current with an increase in the water flow and decrease the magnitude of the electrical current with a decrease in the water flow so as to maintain a constant biocide concentration (or at least a biocide concentration within a target range) in the water discharged from the first chamber 26.

In certain examples, the controller 248 is configured to terminate power to the electrode arrangement when a flow stoppage is detected. The flow stoppage may be detected by a flow sensor such as the flow sensor 51, by monitoring the operational state (e.g., on or off state) of the water system pump, or other means.

Figure 5:
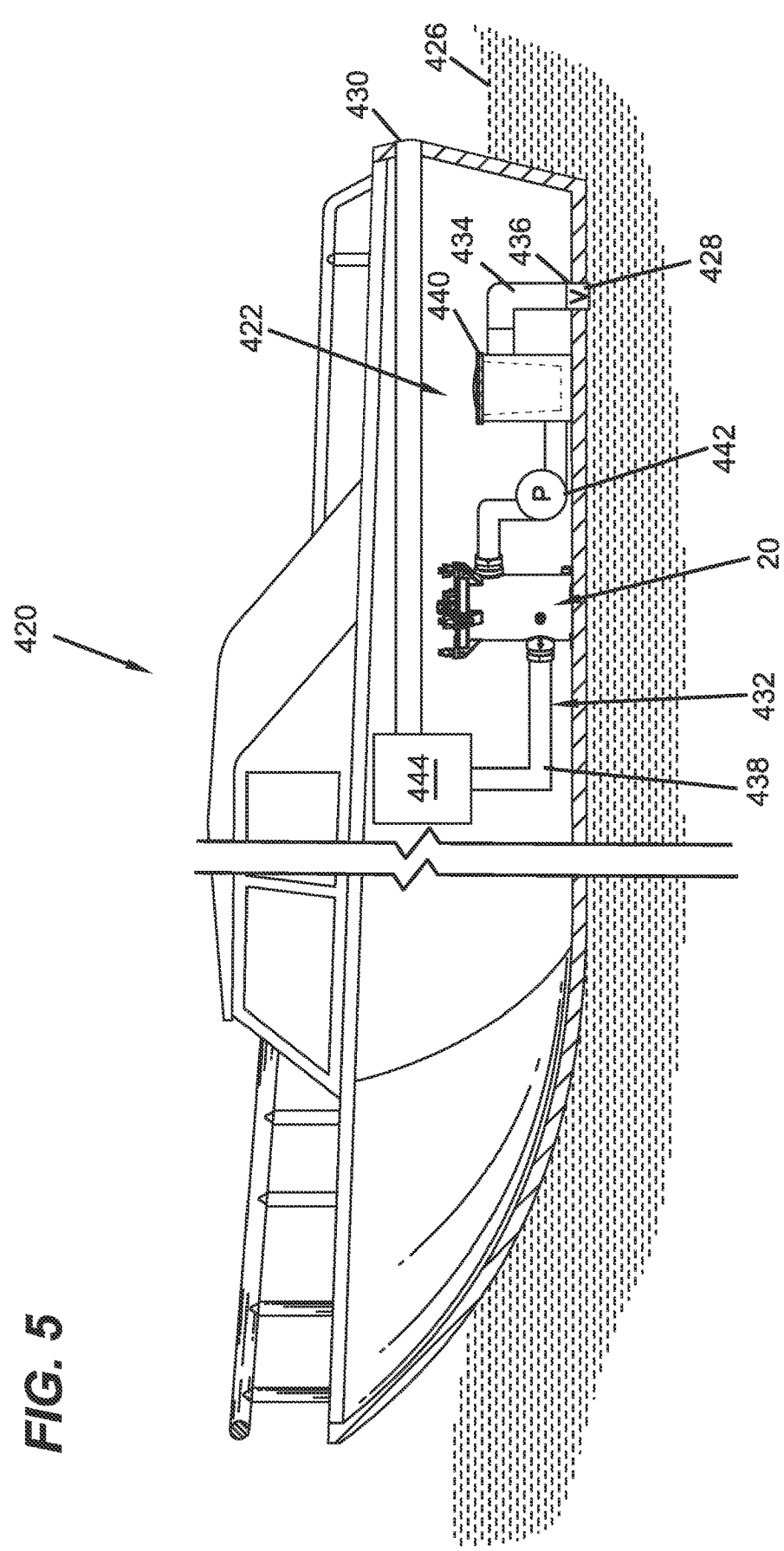
FIG. 5 illustrates a watercraft having an on-board water system incorporating the biocide-generating system of FIGS. 1-2.

FIG. 5 illustrates a watercraft 420 having an on-board water system 422 including the biocide-generating device 20 in accordance with the principles of the present disclosure. The watercraft 420 is shown supported on a body of water 426. The on-board water system 422 includes an inlet 428, an outlet 430, and a water flow path 432 that extends from the inlet 428 through the watercraft 420 to the outlet 430. The inlet 428 is configured for drawing water from the body of water 426 into the water flow path 432. The inlet 428 is located below a water line 434 of the watercraft 420 and is preferably located at a bottom of the hull of the watercraft 420. The inlet 428 can be opened and closed by a valve 436 such as a seacock. The outlet 430 is configured for discharging water that has passed through the water flow path 432 back to the body of water 426. Preferably, the outlet 430 is positioned above the water line 434. The on-board water system 422 can include a plurality of components positioned along the water flow path 432. The water flow path 432 can include a plurality of conduits 438 (e.g., hoses, tubes, pipes, etc.) which extend between the components of the on-board water system 422 and function to carry water along the water flow path 432 between the various components. As shown at FIG. 5, the depicted components include a water strainer 440, a pump 442, and one or more systems and/or equipment 444 that make use of water conveyed through the water flow path 432. The biocide-generating device 20 is adapted for generating a biocide within the water of the water flow path 432 while the water passes through the biocide-generating device 20. The biocide is configured for inhibiting biofouling within the conduits 438 and within one or more of the components positioned along the water flow path 432. It will be appreciated that the biocide can also be referred to as a disinfecting agent or a cleaning agent since the biocide can also include disinfecting and cleaning properties.

Figure 6:
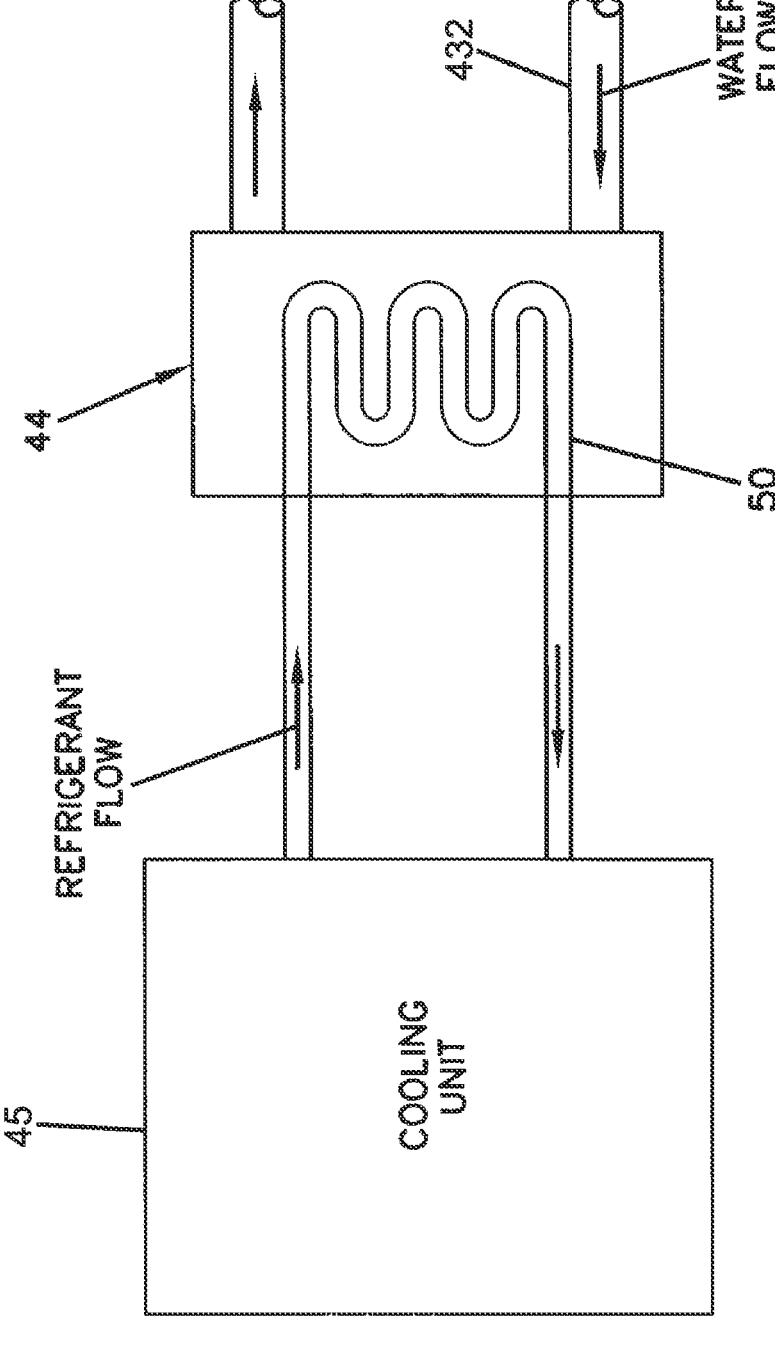
FIG. 6 depicted an example heat exchanger that can be cooled by a water system of a boat.

It will be appreciated that examples of the type of the systems and/or equipment 444 that can benefit from biocide treatment can include cooling systems such as air conditioners or chillers where water drawn from the body of water 426 can be used as a cooling media for cooling refrigerant of the cooling systems. In other examples, the water from the water flow path 432 can be used to provide engine cooling. FIG. 6 shows an example piece of equipment 44 in the form of a heat exchanger for a cooling unit 45 such as an air conditioner or other cooling system. Within the heat exchanger, water from the water flow path 432 flows across coils 50 or other conduits through which refrigerant corresponding to the cooling system flows. As the refrigerant flows through the coils 50, the water in the heat exchanger cools the refrigerant within the coils 50. In other examples, water from the water flow path 432 can be used for sanitation systems or watercraft propulsion systems.

In certain examples, biocide-generating systems in accordance with the principles of the present disclosure can include control circuitry for controlling operation of first and second electrodes in a manner that inhibits or resists the accumulation of scale (e.g., precipitation-based scale such as calcium carbonate, calcium hydroxide, magnesium hydroxide, and the like) on the first and second electrodes. Typically, scaling is prone to occur at the cathode of the electrolytic cell because of the alkaline characteristic of the water at the cathode-water interface, but is not prone to occur at the anode because of the lower pH (e.g., acidic characteristic) of the water at the anode-water interface. By alternating the polarity of the first and second electrodes, the first and second electrodes can be switched back and forth between anodes and cathodes. When a given one of the electrodes is operated as an anode, the lower pH of the water at the anode-water interface can assist in dissolving scale that may have been formed on the electrode when the electrode was previously operated as a cathode. Thus, continuously switching the polarity of the first and second electrodes inhibits the accumulation of scale on the electrodes to a level in which the performance or efficiency of the electrolytic cell is compromised. In one example, the electrolytic cell has an undivided arrangement in which the first and second electrodes are not separated by a membrane.

In certain examples, the biocide-generating system includes a switch arrangement that alternates operation of the electrolytic cell between a forward biocide-generating state (e.g., corresponding to a first switch configuration) and a reverse biocide-generating state (e.g., corresponding to a second switch configuration). In the forward biocide-generating state, the first electrode is operated as an anode and the second electrode is operated as a cathode such that current flows in a forward direction between the first and second electrodes through the sea water within the electrolytic cell causing the generation of biocide in the sea water. In the reverse biocide-generating state, the first electrode is operated as a cathode and the second electrode is operated as an anode such that current flows in a reverse direction between the first and second electrodes through the sea water within the electrolytic cell causing the generation of biocide in the sea water. It will be appreciated that as the biocide-generating system is operated in each one of the forward and reverse biocide-generating states, an ion concentration gradient can develop and increase in intensity over time within the electrolytic cell. For example, the concentration of certain negative ions (e.g., $Cl^-$) can increase adjacent the anode and the concentration of certain positive ions (e.g., $Na^+$) can increase adjacent the cathode.

Aspects of the present disclosure relate to operating the electrolytic cell in each of the forward and reverse biocide-generating states for a relatively short duration D1 (see FIG. 7) (e.g., less than or equal to 10 minutes, or less than or equal to 8 minutes, or less than or equal to 6 minutes, or less than or equal to 5 minutes, or less than or equal to 3 minutes) before alternating the biocide-generating state. The biocide-generating system can also be operated temporarily in a discharge state (e.g., corresponding to a third switch configuration) as the system is switched between the opposite biocide-generating states. In the discharge state, electrical power is not provided to the electrodes and the electrodes are electrically connected by a short circuit to quickly eliminate electric potential that may exist between the electrodes at the time power to the electrodes is terminated.

Figure 7:
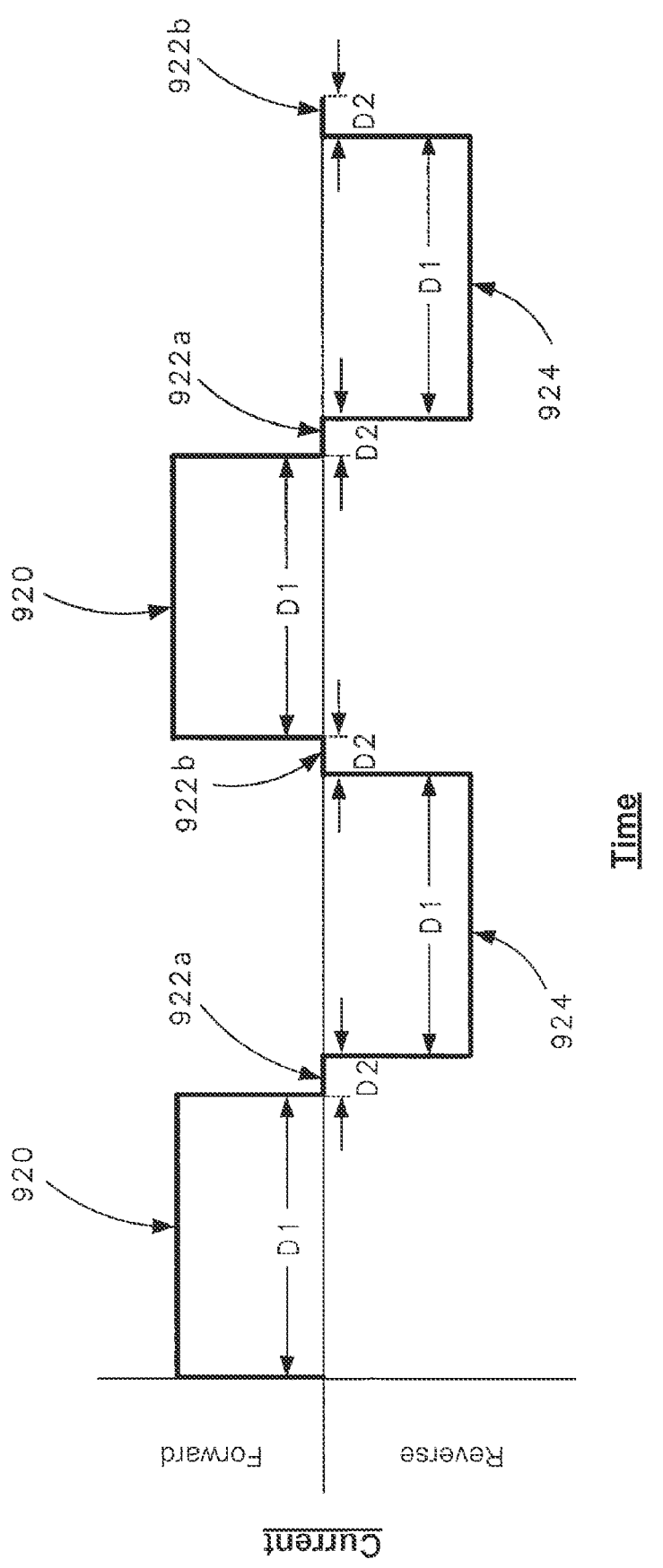
FIG. 7 depicts an example polarity switching scheme suitable use for controlling polarity shifting of biocide-generating devices suitable for practicing aspects of the present disclosure.

FIG. 7 is a graph showing electrical current applied across the first and second electrodes over time. The graph is representative of a control protocol for controlling the application of electrical current across the first and second electrodes. The control protocol can use a repeating pattern of operating states. Referring to FIG. 7, the repeating pattern includes a forward biocide-generating operating state (see 920) operated for the first duration D1, followed by an ion re-distribution operating state (see 922a) operated for the second duration D2, followed by a reverse biocide-generating operating state (see 924) operated for the first duration D1, followed by the ion-redistribution state (see 922b) operated for the second duration D2. Thereafter, the pattern is repeated as biocide is generated.

Figure 8:
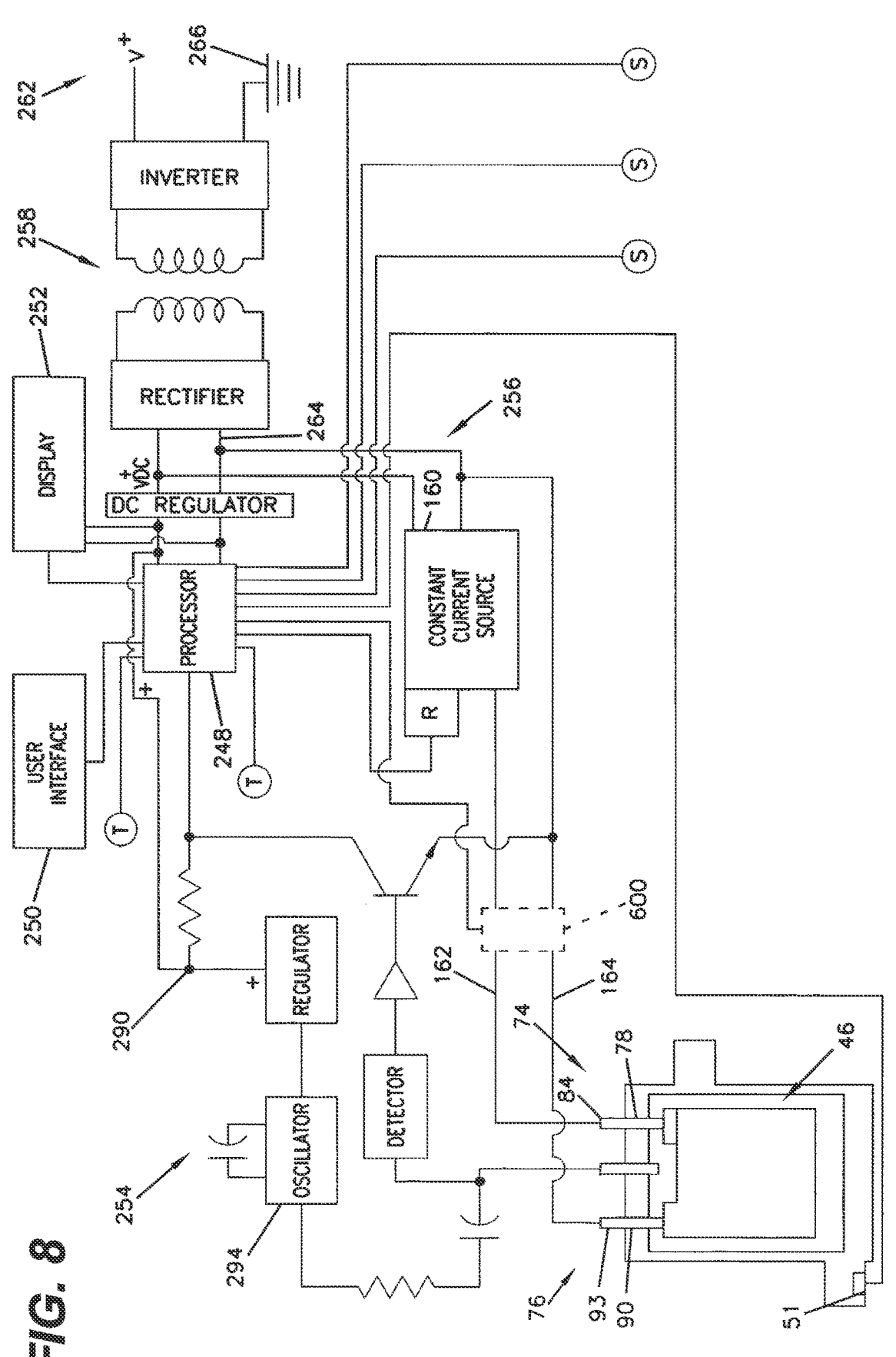
FIG. 8 depicts a schematic lay-out of an example biocide-generating device suitable for practicing aspects to the present disclosure.
Figure 9:
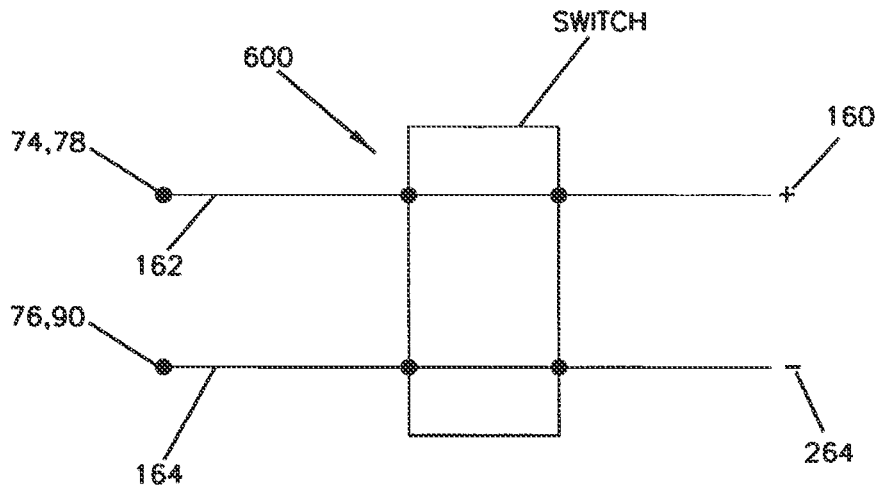
FIG. 9 is a first switch configuration of the biocide-generating device of FIG. 8.
Figure 10:
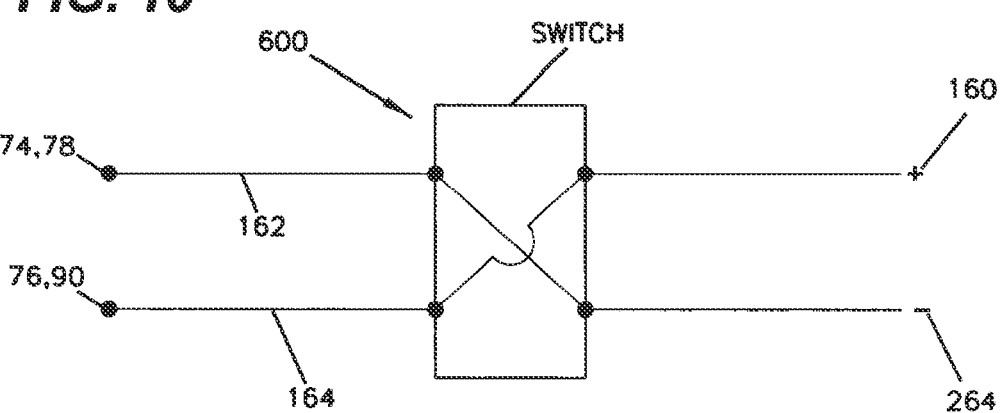
FIG. 10 is a second switch configuration of the biocide-generating device of FIG. 8.
Figure 11:
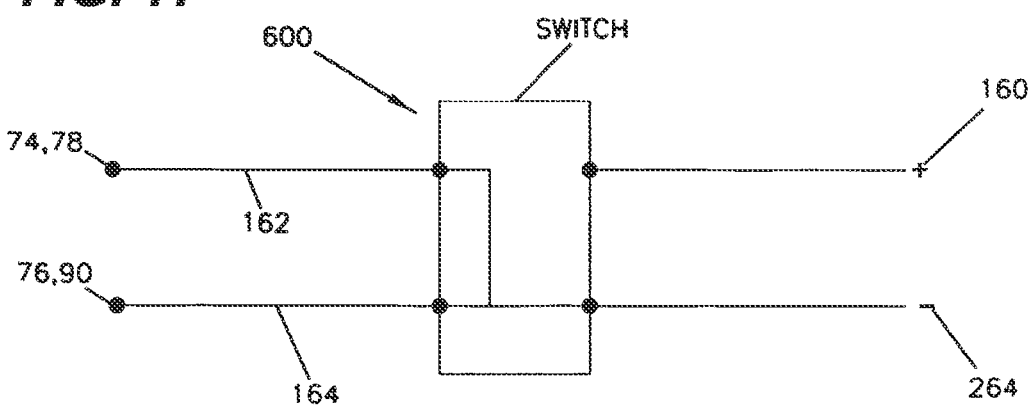
FIG. 11 is a third switch configuration of the biocide-generating device of FIG. 8.

Referring to FIG. 8, the cell power circuit 256 preferably includes switching device 600 which is preferably configured for alternating (e.g., switching, forward and reversing, etc.) the polarity of the electrolytic cell 46 to inhibit the accumulation of scale on the electrodes as previously described. The switching device 600 can be configured in two different switch configurations corresponding to two different polarity states (e.g., polarity modes, polarity configurations, etc.) In a first switch configuration (see FIG. 9), the switching device 600 couples the current source 160 (e.g., a constant current source as shown at FIG. 8) to the first terminal 78 (e.g., via lead 162) and couples the zero voltage reference 264 to second terminal 90 (e.g., via lead 164). In the first switch configuration the electrodes 74, 76 are operated in a first polarity state in which the first electrode 74 is an anode and the second electrode 76 is a cathode. In a second switch configuration (see FIG. 10), the switching device 600 couples the constant current source 160 to the second terminal 90 (e.g., via lead 164) and couples the zero voltage reference 264 to the first terminal 78 (e.g., via lead 162), thereby reversing the polarity compared to the first switch configuration. In the second switch configuration the electrodes 74, 76 are operated in a second polarity state in which the first electrode 74 is a cathode and the second electrode 76 is an anode. By reversing the polarity of the electrodes 74, 76 back and forth between the first and second polarity states during time periods in which biocide is intended to be generated, the accumulation of scale on the electrode plates of the electrodes 74, 76 over time is reduced. Preferably, the first and second electrodes 74, 76 are temporarily electrically connected (see FIG. 11) before switching from one electrode polarity state to another to provide an electrical short between the electrodes 74, 76. The temporary connection can have a duration D2 as shown at FIG. 7.

In certain examples, the processor 248 of the control unit 48 can interface with and coordinate operation of the switching device 600. For example, the processor 248 may control the frequency in which the switching device 600 is switched between the first and second configurations. While water is flowing through the system, it is desirable for the electrolytic cell 46 to be generating biocide. Typically, during biocide generation, the electrolytic cell 46 will be repeatedly switched back and forth between the first polarity state and the second polarity state. The electrolytic cell is preferably operated for a first duration D1 in the first polarity state before being switched to the second polarity state and is also operated for the first duration D1 in the second polarity state before being switched back to the first polarity state. In certain examples, the first duration D1 can be in the range of 3-5 minutes, but as indicated previously other durations can be used as well.

To expedite the movement of ions in the electrolyte away from the electrodes (e.g., equilibrating the ions in the electrolyte) before switching the system electrodes between the different polarity states, it is preferred for electrical power to the first and second electrodes to be terminated (i.e., a difference in electric potential is not provided between the first and second electrodes) and for the first and second electrodes 74, 76 to be electrically connected to each other (e.g., short circuited). In one example, the switching device 600 is operable in a third switch configuration (see FIG. 11) in which electrical power from the constant current source 160 is terminated to the first and second electrodes 74, 76 and the first and second electrodes 74, 76 are both electrically connected to each other and to the zero voltage reference 264. The electrolytic cell is preferably operated in the third switch configuration for the second duration D2 before switching to a subsequent electrode polarity state.

Figure 12:
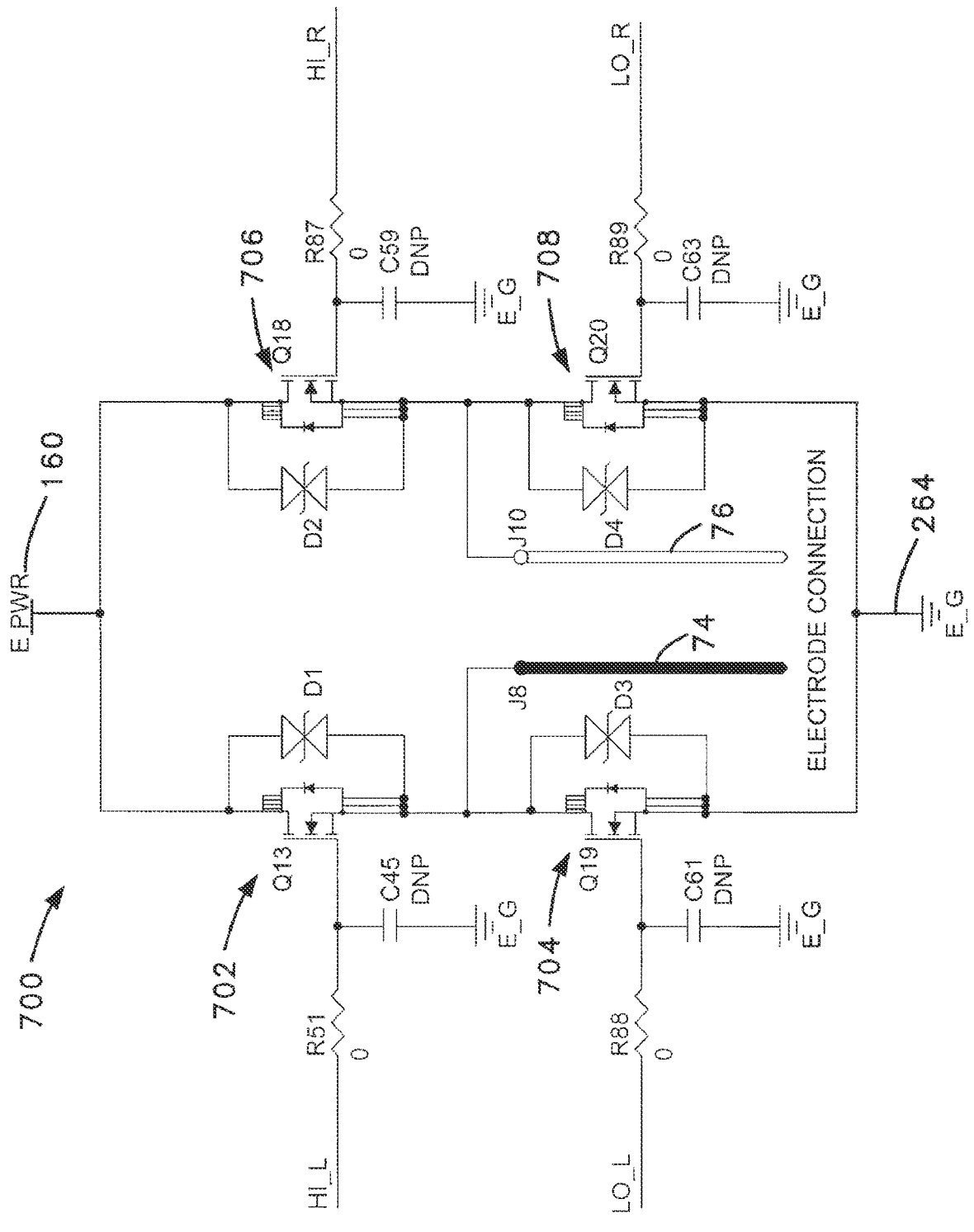
FIG. 12 depicts an example switching device suitable for use with the biocide-generating device of FIG. 8.

FIG. 12 depicts an example switch arrangement 700 suitable for functioning as the switching device 600. The switch arrangement 700 is depicted as having an H-bridge design including a first switch 702, a second switch 704, a third switch 706 and a fourth switch 708. In one example, the switches 702, 704, 706 and 708 are transistors such as metal oxide semiconductor field-effect transistors (MOS-FETS). When the first and fourth switches 702, 708 are on (i.e., closed) and the second and third switches 704, 706 are off (i.e., open), the switch arrangement 700 is in the first switching configuration in which the first electrode 74 is electrically connected to power (e.g., the constant current source 160) and the second electrode 76 is electrically connected to the zero voltage reference 264. When the first and fourth switches 702, 708 are off (i.e., open) and the second and third switches 704, 706 are on (i.e., closed), the switch arrangement 700 is in the second switching configuration in which the first electrode 74 is electrically connected to the zero voltage reference 264 and the second electrode 76 is electrically connected to power (e.g., constant current source 160). When the first and third switches 702, 706 are off (i.e., open) and the second and fourth switches 704, 708 are on (i.e., closed), the switch arrangement 700 is in the third switching configuration in which the first and second electrodes 74, 76 are both electrically connected to each other and to the zero voltage reference 264.

There are situations in which seawater pumps such as pump 442 in watercraft are turned on and off as part of regular operational cycles corresponding to the equipment through which the water flow path 432 passes. One example relates to air conditioners, which cycle on and off to maintain cabin temperatures at values set by a thermostat or for other reasons. When an air conditioner cycles off, the pump 442 is de-activated such that flow through the biocide-generating device 20 and the heat exchanger of the air conditioner stops. When flow through the biocide-generating device 20 stops, the controller 248 terminates power to the electrodes 74, 76. For this type of application, the duration D1 that the controller 248 operates the electrodes at a particular one of the polarities prior to switching to the opposite polarity can be greater than the duration of the on-period of the equipment through which the water flow path 432 passes (e.g., the heat exchanger of the air conditioner). This raises an issue if when the pump 442 is re-activated for the next on-period of the equipment and the biocide-generating device 20 is also activated, the controller always initially powers the electrodes at the same polarity (e.g., the first switch configuration) since the biocide-generating device 20 would never operate long enough for the electrical current supplied to the electrodes to be switched to the opposite polarity (e.g., the second switch position). Repeatedly operating the biocide-generating device 20 at the same polarity for cycle after cycle without switching polarity can result in excessive scaling of the electrodes. To avoid this from occurring, aspects of the present disclosure relate to different control strategies designed to ensure adequate polarity switching occurs even if the system is cyclically operated at biocide-generating periods having durations less than the polarity switching duration D1.

Figure 13:
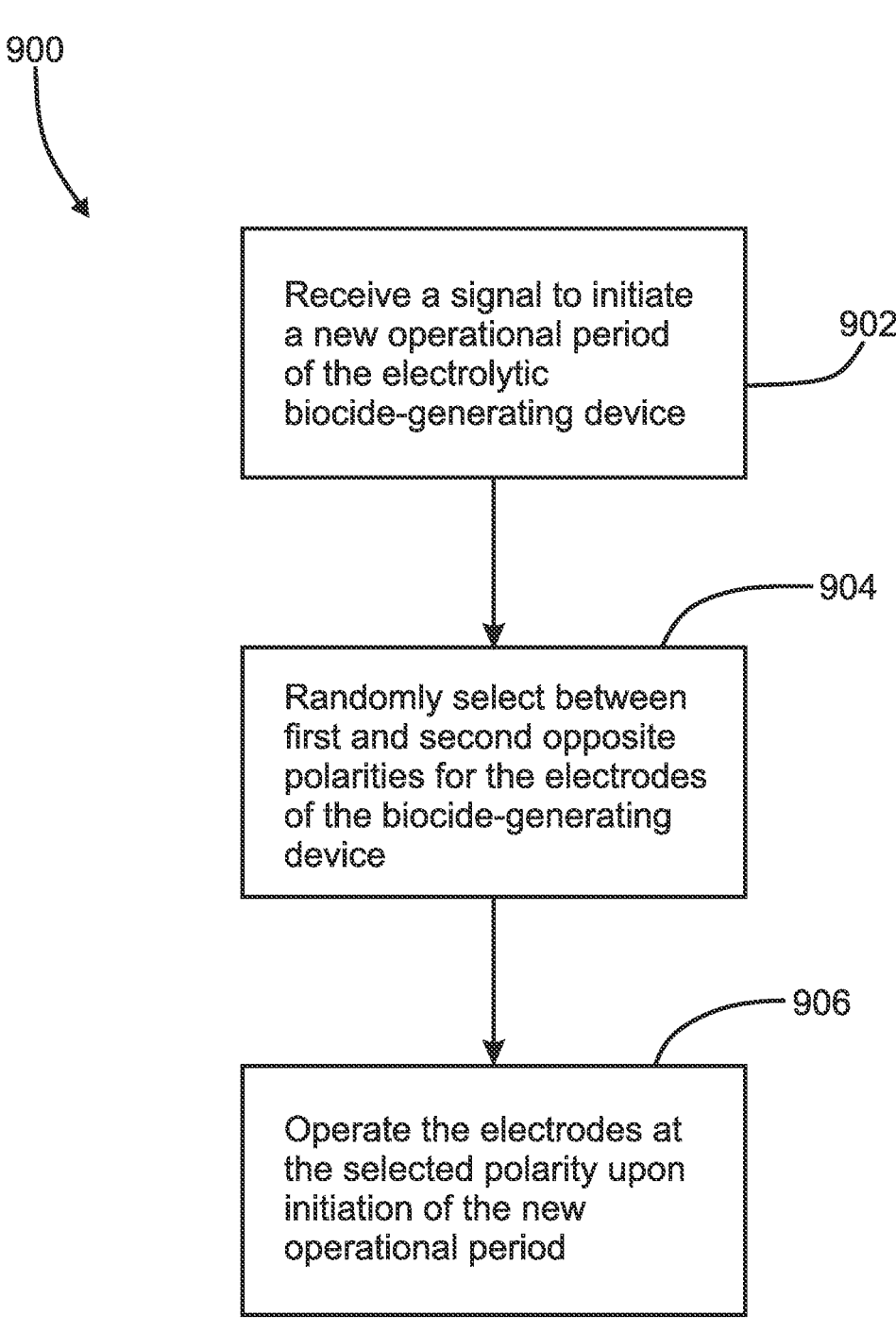
FIG. 13 outlines an example control strategy in accordance with the principles of the present disclosure for preventing scaling of an electrolytic biocide-generating device.

FIG. 13 outlines one control strategy 900 that can be implemented to ensure adequate polarity switching occurs during a consecutive series of operational periods of the biocide-generating device 20 even if the operational periods have durations less than the polarity switching duration D1. Under normal operating conditions, the controller 248 de-activates the biocide-generating device 20 in response to de-activation of the pump 442 (e.g., as indicated by a stoppage of water flow through the biocide-generating device 20). When the pump 442 is re-activated, a signal is sent to the controller 248 to initiate a new operational period of the biocide-generating device 20. The signal can be prompted by sensing the activation of the pump 442, by sensing flow water flow through the biocide-generating device or by other means. Upon receipt of the signal, the controller initiates a new operational period of the biocide-generating device 20 (see step 902). When initiating activation of the new operational period of the biocide-generating device, the controller 248 randomly selects between first and second opposite polarities (e.g., between the first and second switch configurations) for application to the electrode arrangement 32 (see step 904). The controller then puts the selected polarity into effect (e.g., implements the selected polarity) such that the electrode arrangement 32 is operated at the selected polarity upon initiation of the operational period (see step 906). Randomly selecting the polarity (e.g., switch configuration) from opposite polarities (e.g. from the first and second switch configurations) each time an operational period of the biocide-generating device 20 is initiated ensures that on average the system will be initiated an equal number of times at each of the opposite polarities over an extended number of operational periods.

FIG. 14 outlines another control strategy 910 that can be implemented to ensure adequate polarity switching occurs during a consecutive series of operational periods of the biocide-generating device 20 even if the operational periods have durations less than the polarity switching duration D1. Under normal operating conditions, historical information regarding operation of the biocide-generating device 20 is saved in memory by the controller 248. The historical information can include information relating to the polarity at which the electrode arrangement 32 was operated during one or more preceding operational periods. Under normal operating conditions, the controller 248 de-activates the biocide-generating device 20 in response to de-activation of the pump 442 (e.g., as indicated by a stoppage of water flow through the biocide-generating device 20) and saves historical polarity information relating to the previous operational period in memory. Subsequently, when the pump 442 is re-activated, a signal is sent to the controller 248 to initiate a new operational period of the biocide-generating device 20. The signal can be prompted by sensing the activation of the pump 442, by sensing flow water flow through the biocide-generating device or by other means. Upon receipt of the signal, the controller initiates a new operational period of the biocide-generating device 20 (see step 912). When initiating activation of the new operational period of the biocide-generating device, the controller 248 uses the historical information saved in memory to select between first and second opposite polarities (e.g., between the first and second switch configurations) for application to the electrode arrangement 32 (see step 914). The controller then puts the selected polarity into effect (e.g., implements the selected polarity) such that the electrode arrangement 32 is operated at the selected polarity upon initiation of the operational period (see step 916).

In one example, historical polarity information includes the switch configuration that was in effect when the biocide-generating device was activated during one or more of the previous operational periods. In one example, the previous operational period from which the historical polarity information is saved and later accessed is the immediately preceding operational period and the polarity selected to be used during activation is opposite from the polarity that had been selected to be used when the biocide-generating device was activated during the immediately preceding operational period.

In another example, the historical polarity information includes the polarity that was in effect when the immediately preceding operational period was terminated and a duration T1 that the biocide-generating system had been operating at the polarity immediately before termination of the immediately preceding operational period. In this case, during subsequent activation of the biocide-generating system to start a new operational period, the controller 248 can initially operate the biocide-generating device in the polarity selected to be the same switch position that was in place at termination of the immediately preceding operational period. The biocide-generating device can be operated in the selected polarity for a duration T2 equal to the difference between the duration T1 and the polarity switching duration D1. Once the biocide-generating system has been operated for the duration T2, the controller 248 can switch the switching arrangement of the biocide-generating device to the opposite switch configuration to change the polarity of the current provided to the electrodes. Thereafter, until the system is deactivated (e.g., corresponding to flow stoppage), the system can resume a switching pattern as shown at FIG. 7 in which each polarity is run for the duration D1 before switching polarities.

In another example, the historical polarity information includes the polarity that was in effect when the immediately preceding operational period was terminated and the duration T1 that the biocide-generating system had been operating at the polarity immediately before termination of the immediately preceding operational period. In this case, during subsequent activation of the biocide-generating system to start a new operational period, the controller 248 can initially operate the biocide-generating device in the polarity selected to be the same switch position that was in place at termination of the immediately preceding operational period if T1 is less than a predetermined minimum operational period T3. Alternatively, if the duration T1 is greater than the predetermined minimum operational period T3 during subsequent activation of the biocide-generating system, the controller 248 can initially operate the biocide-generating device in the polarity selected to be the opposite switch position that was in place at termination of the immediately preceding operational period. Once the polarity at start-up has been established and implemented, the system can resume a switching pattern as shown at FIG. 7 in which each polarity is run for the duration D1 before switching polarities. This pattern can be maintained until the system is deactivated (e.g., due to a water flow stoppage). Upon re-activation to start a new operational period, the polarity selection protocol outlined above can again be used to establish the polarity used at the start of the new operational period.

In still another example, the historical polarity information can include a running total of the total time the biocide-generating system is operated in each of the first and second switch configurations (e.g., first and second polarities) can be maintained. At the time a new operational period of the biocide-generating device is initiated for generating biocide, the controller 248 can reference the logged historical running time information for each of the first and second switch configurations and can compare the running time values for each switch configuration to identify which of the two switch configurations has a lower running time value. Then, the controller 248 can select the switch configuration with the lower running time value as the switch position to be implemented at the time the new operational period is initiated.

In another example, the historical polarity information includes historical data regarding how long the biocide-generating system had been operated in each of the first and second switch configurations, and/or includes comparative data regarding how long the biocide-generating system had been operated in each of the first and second switch configurations, and/or includes comparative data regarding how many times the biocide-generating system had been operated in each of the first and second switch configurations.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide-generating system for inhibiting biofouling within a water system of a watercraft, the water system being configured to draw water from a body of water on which the watercraft is supported, the biocide-generating system comprising:

an electrode arrangement adapted to be incorporated as part of an electrolytic cell through which the water of the water system flows;

a control system that interfaces with the electrode arrangement, the control system including an electrical power circuit for establishing a flow of electrical current between a first electrode and a second electrode of the electrode arrangement to generate a biocide in the water within the electrolytic cell, the control system including a switching arrangement operable in a first switch configuration in which the first electrode is an anode and the second electrode is a cathode, the switching arrangement also being operable in a second switch configuration in which the first electrode is a cathode and the second electrode is an anode;

wherein a pump is configured to have on-cycles, wherein the biocide is generated by the biocide-generating system during the on-cycles, the pump being inactive immediately prior to each of the on-cycles and switched off at an end of each of the on-cycles, a first of the on-cycles having a first duration, the control system being configured to switch from the first switch configuration to the second switch configuration during one of the on-cycles when the one of the on-cycles has a second duration that is longer than the first duration;

wherein the control system is configured such that during the first of the on-cycles the switching arrangement is initially in the first switch configuration when the electrical power circuit is on and establishing the electrical current flowing between the first electrode and the second electrode;

wherein the control system is configured such that during a second of the on-cycles, the switching arrangement is initially in the second switch configuration when the electrical power circuit is on and establishing the electrical current flowing between the first electrode and the second electrode; and wherein the control system is configured such that the electrical power circuit does not turn on after the end of the first of the on-cycles and before a start of the second of the on-cycles.

2. The biocide-generating system of claim 1, wherein information about the first of the on-cycles and the second of the on-cycles is stored in memory.

3. The biocide-generating system of claim 1, wherein the control system is configured to use historical data regarding how long the biocide-generating system had been operated in each of the first switch configuration and the second switch configuration to select, for the switching arrangement at the beginning of the second of the on-cycles, the second switch configuration.

4. The biocide-generating system of claim 1, wherein the control system is configured to use comparative data regarding how long the biocide-generating system had been operated in each of the first switch configuration and the second switch configuration to select, for the switching arrangement at the beginning of the second of the on-cycles, the second switch configuration.

5. The biocide-generating system of claim 1, wherein the control system is configured to use comparative data regarding how many times the biocide-generating system had been operated in each of the first switch configuration and the second switch configuration to select, for the switching arrangement at the beginning of the second of the on-cycles, the second switch configuration.

6. The biocide-generating system of claim 1, wherein the control system is configured to use historical running time information logged for each of the first switch configuration and the second switch configuration to select, for the switching arrangement at the beginning of the second of the on-cycles, the second switch configuration.

7. The biocide-generating system of claim 1, wherein the switching arrangement is operable in a third switch configuration in which electrical power is terminated to the first electrode and the second electrode and the first electrode and the second electrode are electrically connected to one another via a short circuit.

8. The biocide-generating system of claim 7, wherein during biocide generation the control system is configured to switch the switching arrangement from one of the first switch configuration and the second switch configuration to the other of the first switch configuration and the second switch configuration after operating the one of the first switch configuration and the second switch configuration for a predetermined duration.

9. The biocide-generating system of claim 8, wherein each time the control system switches the switching arrangement between the first switch configuration and the second switch configuration, the control system is configured to temporarily switch the switching arrangement to the third switch configuration.

10. The biocide-generating system of claim 8, wherein the predetermined duration is less than or equal to 10 minutes.

11. The biocide-generating system of claim 1, wherein the first duration is less than five minutes.

* * * * *